(12) United States Patent
Green

(10) Patent No.: US 8,944,269 B2
(45) Date of Patent: Feb. 3, 2015

(54) MARINE LOCKING GAS CAP

(75) Inventor: Michael Philip Green, Pacheco, CA (US)

(73) Assignee: Vehicle Enhancement Labs, Bellflower, CA (US)

( * ) Notice: Subject to any disclaimer, the term of this patent is extended or adjusted under 35 U.S.C. 154(b) by 2747 days.

(21) Appl. No.: 11/271,378

(22) Filed: Nov. 10, 2005

(65) Prior Publication Data
US 2007/0102431 A1    May 10, 2007

(51) Int. Cl.
```
B65D 55/14      (2006.01)
E05B 35/00      (2006.01)
E05B 83/34      (2014.01)
B65D 53/02      (2006.01)
B60K 15/04      (2006.01)
B60K 15/03      (2006.01)
B63B 17/00      (2006.01)
```

(52) U.S. Cl.
CPC .............. *E63J 99/00* (2013.01); *E05B 35/008* (2013.01); *E05B 83/34* (2013.01); *B60K 15/0406* (2013.01); *B60K 2015/03434* (2013.01); *B63B 2017/0009* (2013.01)
USPC ............ 220/210; 220/304; 220/284; 220/375

(58) Field of Classification Search
USPC .......................... 220/304, 310, 284, 375, 210
See application file for complete search history.

(56) References Cited

U.S. PATENT DOCUMENTS

| | | | | |
|---|---|---|---|---|
| 240,397 | A * | 4/1881 | Ehmer | 70/156 |
| 909,785 | A * | 1/1909 | Hall | 362/165 |
| 2,138,871 | A * | 12/1938 | Malluk | 70/165 |
| 3,320,783 | A * | 5/1967 | Kerr | 70/401 |
| 3,334,772 | A * | 8/1967 | Henderson | 220/284 |
| 3,927,792 | A * | 12/1975 | Andrade et al. | 220/210 |
| 4,231,240 | A * | 11/1980 | Fujita et al. | 70/173 |
| 4,984,698 | A * | 1/1991 | Stuckey | 215/207 |
| 5,586,670 | A * | 12/1996 | Greenwald | 215/207 |
| 5,873,475 | A * | 2/1999 | Volpe | 215/207 |
| 5,901,869 | A * | 5/1999 | Ohmura et al. | 220/210 |
| 6,223,923 | B1 * | 5/2001 | Fishman | 220/210 |
| 6,935,527 | B1 * | 8/2005 | Brock | 220/210 |
| 7,322,218 | B2 * | 1/2008 | Yonemura et al. | 70/162 |
| 7,413,095 | B2 * | 8/2008 | Bertani et al. | 220/210 |
| 2003/0127457 | A1 * | 7/2003 | Byrne | 220/210 |
| 2004/0079756 | A1 * | 4/2004 | Abe et al. | 220/375 |

* cited by examiner

*Primary Examiner* — Mickey Yu
*Assistant Examiner* — Niki Eloshway
(74) *Attorney, Agent, or Firm* — Novak Druce Connolly Bove+ Quigg LLP

(57) ABSTRACT

A watercraft fuel cap having the ability to lock in place to a common fuel filler receiver and having a series of unique downward slot designs and necessitating a matching downward slot designed key for tightening or removing the fuel cap from the fuel filler receiver. The fuel cap would also have the ability for a tethering device which attaches the fuel cap and the fuel receiver together. When the fuel cap is removed for the re-fueling process the tether allows for removal but limits the distance the fuel cap can be moved away from the fuel filler receiver. The tether keeps the fuel cap from being missed placed or falling into the water.

4 Claims, 3 Drawing Sheets

MARINE LOCKING GAS CAP

BACKGROUND OF THE INVENTION

1. Field of the Invention

The present invention relates to watercraft of all types and having the ability to lock the fuel cap to the fuel filler receiver to prevent the possibility of theft of a vessel's gasoline or diesel fuel. One familiarity with watercraft is to understand that most vessels have larger fuel capacities then most automotive applications. Smaller watercraft have the ability to hold 5 or more gallons of fuel while larger watercraft have the ability to hold over 1000 gallons of fuel. With today's increasing cost of gasoline or diesel fuel, a locking fuel cap will allow the watercraft owner the ability to protect their costly fuel investment.

2. Description of Related Art

Most watercraft share a common type fuel filler receiver and fuel cap design only having a variance in size or opening and closing design. On top of a common fuel cap are two holes drilled a set distance apart for a common removing tool or a long slot across the top of the fuel cap which allows for a screw driver tool or the fuel cap could have a combination of both. The fuel cap houses a rubber gasket that when tighten mates with the fuel filler receiver to provide a fuel leak prove seal. The fuel filler receiver receives the fuel cap through a series of screw threads with the fuel filler receiver being of female threads and the fuel cap being of male threads. This allows the fuel cap to screw into the fuel filler receiver and when tighten allows for not only a fuel leak prove seal but also a water-tight seal not allowing any water to leak into the gasoline or diesel fuel storage tanks.

The fuel filler receiver generally mounts onto a flat surface of the watercraft and is held permanently in place by a series of screws or bolts. Connected to the fuel filler receiver is either a metal tube or rubber hose that allows fuel to flow from the fuel filler receiver to the fuel storage tank during the re-fueling process. Once the fueling process has been completed the fuel cap is threaded back onto the fuel filler receiver with the appropriate tool.

SUMMARY OF THE INVENTION

A watercraft locking fuel cap comprises of a round flat surface handle area for covering the fuel filler receiver opening, a rubber gasket to seal the fuel cap to the fuel filler receiver. A threaded portion allows the fuel cap to screw and tighten into the fuel filler receiver or unscrew for removal. Each individual fuel cap produced would have a special multiple slot design recessed downward into the top of the round flat surface handle area of the fuel cap. The design would require a special matching downward slot key that inserts into the recessed downward receiving slots in the fuel cap for installing and tightening or removing the tighten fuel cap from the fuel filler receiver. A tether line is attached to the bottom side of the fuel cap and to the bottom of the fuel filler receiver tethering the fuel cap to the fuel filler receiver so the fuel cap can not be lost during the re-fueling process. The fuel caps can be constructed from but should not be limited to all forms of metals or plastics. The above invention should not be limited to just watercraft, the special matching downward slot design with the matching downward slot key could be utilized and modified to work on any type of application necessitating a corrosion prove locking device.

DETAILED DESCRIPTION OF THE INVENTION

In accordance with the present invention, a watercraft fuel cap containing a downward integrated series of slots unique to each fuel cap produced and requiring a matching downward slot key used for either removing or tightening the fuel cap to the fuel filler receiver. A rubber gasket located under the flat surface but above the threaded portion of the fuel cap that seals the fuel cap to the fuel filler receiver when tightened, provides a fuel and water tight seal. A threaded portion located below the flat surface and rubber gasket on the bottom side of the fuel cap allows the fuel cap to thread into the fuel filler receiver internal threads. A tether line which mounts inside the threaded portion of the bottom side of the fuel cap and mounts below the bottom of the internal threaded portion of the fuel filler receiver opening and connects the fuel cap to the fuel filler receiver so when the fuel cap is removed, the fuel cap does not have the ability to fall in the water during the re-fueling process. This invention also affords the watercraft owner the ability to protect the owner's fuel investment.

Figure 1:
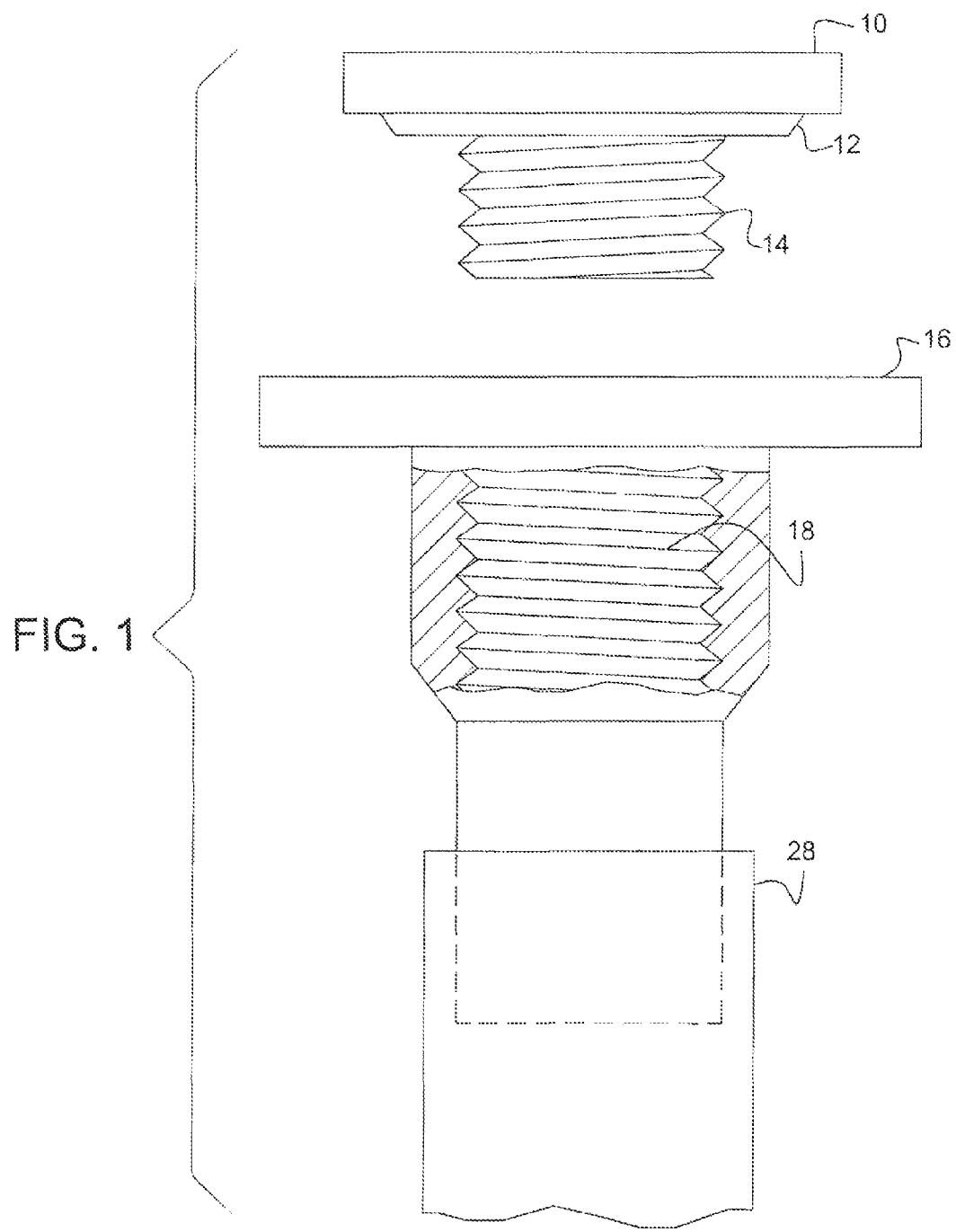
FIG. 1 Is a perspective common side view of a current designed fuel cap, rubber gasket, threaded portion on the fuel cap, fuel filler receiver, threaded portion in the fuel filler receiver and a metal tube or rubber hose for transferring fuel to the fuel storage tank.

FIG. 1 Shows a common manufactured fuel cap 10, rubber gasket 12, threaded portion 14, fuel filler receiver 16, threaded portion inside the fuel filler receiver 18 and a fuel transfer hose 28 which allow fuel to flow to the fuel storage tank.

Figure 2A:
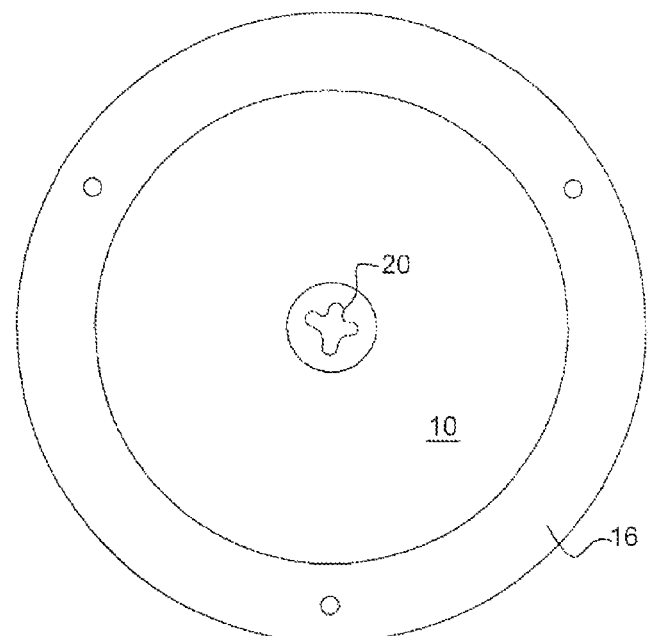
FIG. 2A is a perspective common side view of the fuel cap with recessed machined slots, installed on the fuel filler receiver.
Figure 2B:
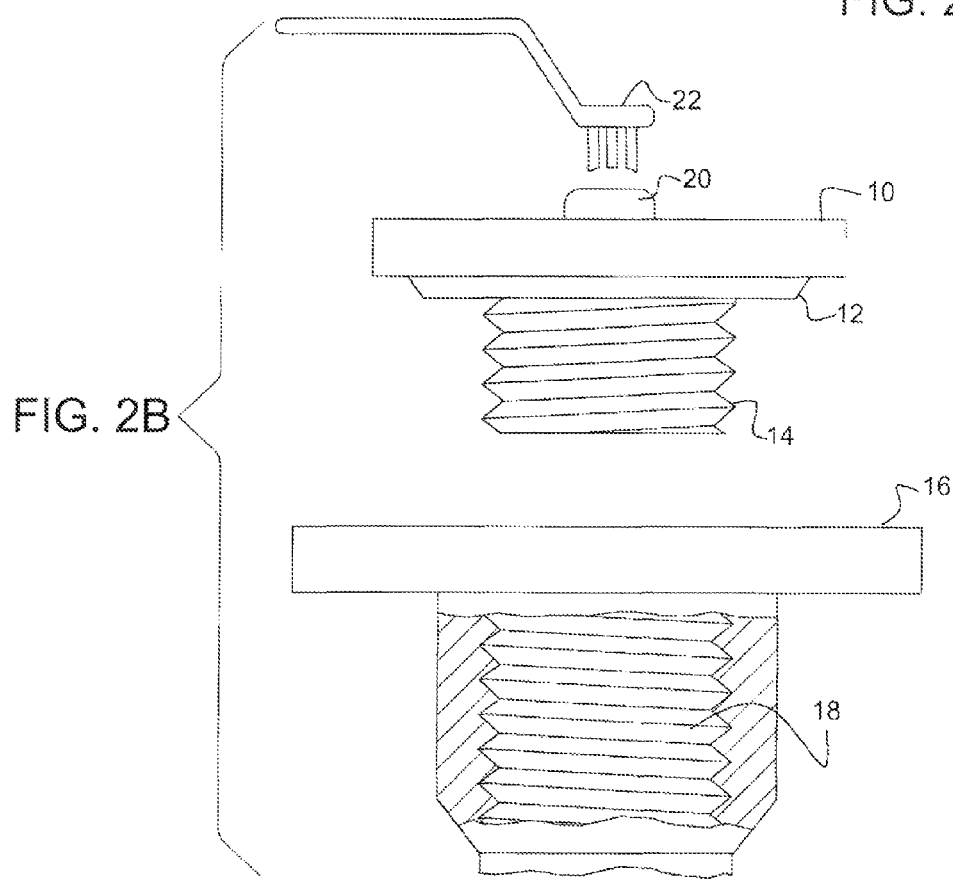
FIG. 2B is a side view of a matching downward slot removing key, the fuel cap, rubber gasket, threaded portion on the fuel cap, a common fuel filler receiver and the threaded portion inside the fuel filler receiver.

FIG. 2 Shows a top view of a common fuel cap 10, with unique downward slots 20, installed on the fuel filler receiver 16. FIG. 2 also has a side view of a matching downward slot key 22 which engages into the downward slots machined into the top handle surface of the fuel cap 10 for installing or removing from the fuel filler receiver 16. A rubber gasket 12 attaches to the fuel cap 10 and is designed to provide a fuel leak prove or water-tight seal against the fuel filler receiver housing 16. The bottom threaded portion of the fuel cap 14 threads into the fuel filler receiver housing threads 18 thus allowing closure to the fuel storage tank.

Figure 3:
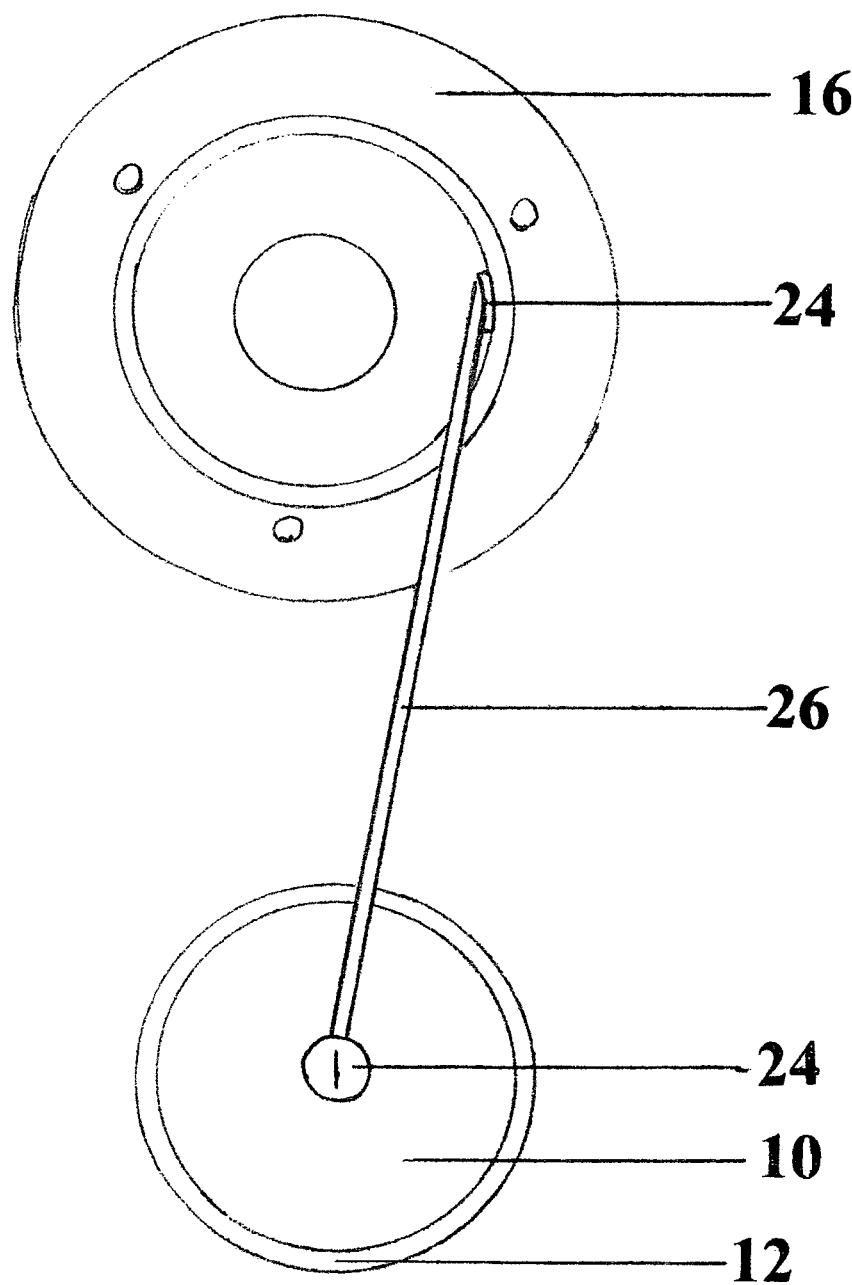
FIG. 3 Is a perspective top view of the fuel filler receiver, a tether mount on the fuel filler receiver, a tether line, and a tether mount on the bottom side of the fuel cap.

FIG. 3 Shows the fuel cap 10 tethered to the fuel filler receiver 16 by providing tether mounts 24 to the fuel cap 10 and fuel filler receiver 16 and a tether line 26.

In operation, the fuel cap 10 seals to the fuel filler receiver 16 through a series of male threads 14 on the fuel cap and female threads 18 on the fuel filler receiver which provide a sealing system for the fuel tank storage area. A machined series of downward slot designs unique to each fuel cap produced will not allow removal without a similar designed downward slot key which matches the machined downward slots in the fuel cap. Once the fuel cap has been tightened to the fuel filler receiver with the machined downward slot key it is very difficult for an individual to remove the fuel cap from the fuel filler receiver without the proper machined slot key. Thus preventing undesirable individuals to remove the fuel cap and allowing them access to remove fuel from the watercraft's fuel storage tank.

The above disclosure and example should not be considered as limitations of the various embodiments of the fuel cap having an integrated slot locking mechanism. Modifications may be made by those with skill in the art to the embodiments described above. For example, various types of watercraft fuel caps are and have been used on all manners of watercraft vessels and could be modified to accept the above invention. The fact of no moving locking parts allow this invention to survive salt water exposure without corroding internal locking mechanism which could over time cause the lock not to function. The above invention could also be modified to allow a cover to lock or thread onto the top of a common fuel cap not allowing exposure to the common removal slot or wrench holes that exist on a common watercraft fuel caps. The same type of locking slot designs could also embody a turning locking latch incorporated into the fuel cap and not allowing access to the fuel storage tank without the proper machined slot key.

Furthermore, any watercraft fuel storage tank which is capable of receiving a fuel cap may be utilized in accordance with the present invention. Consequently, it is clear that modifications may be made by those with skill in the art that are within the following claims.

What is claimed is:
1. A fuel cap comprising:
 a) a round flat surface cover in combination with an engaging means configured to engage into a fuel filler receiver for securing the fuel cap to the fuel filler receiver;
 b) the round flat surface cover defining an exterior face, the exterior face defining a uniquely shaped downwardly directed aperture arranged in a pattern on the exterior face of the round flat surface cover of the fuel cap which uniquely shaped aperture will only accept the same downwardly directed pattern of protrusions of a key for removing or installing the fuel cap to the fuel filler receiver; and,
 c) a key having a downward directed pattern of protrusions to be only accepted by the uniquely shaped aperture.

2. The fuel cap of claim 1 where there are a plurality of apertures arranged in a pattern.

3. The fuel cap of claim 1 where the fuel filler receiver is on a watercraft.

4. The fuel cap of claim 1, where the exterior face of the round flat surface cover is formed in part by a threaded bolt which passes through the round flat surface cover and the aperture is in a head of said bolt.

\* \* \* \* \*